US012700038B2

(12) United States Patent
Jensen et al.

(10) Patent No.: US 12,700,038 B2
(45) Date of Patent: *Aug. 4, 2026

(54) REDUCING DATA TRAFFIC IN A COMPUTERIZED TRADING SYSTEM

(71) Applicant: Nasdaq Technology AB, Stockholm (SE)

(72) Inventors: Daniel Jensen, Stockholm (SE); Tobias Hallor, Stockholm (SE)

(73) Assignee: Nasdaq Technology AB, Stockholm (SE)

( * ) Notice: Subject to any disclaimer, the term of this patent is extended or adjusted under 35 U.S.C. 154(b) by 100 days.

This patent is subject to a terminal disclaimer.

(21) Appl. No.: 18/626,543

(22) Filed: Apr. 4, 2024

(65) Prior Publication Data

US 2024/0249361 A1 Jul. 25, 2024

Related U.S. Application Data

(63) Continuation of application No. 17/855,917, filed on Jul. 1, 2022, now Pat. No. 11,961,144, which is a continuation of application No. 17/067,887, filed on Oct. 12, 2020, now Pat. No. 11,379,919, which is a continuation of application No. 15/827,210, filed on Nov. 30, 2017, now Pat. No. 10,832,326, which is a (Continued)

(51) Int. Cl.
G06Q 40/00 (2023.01)
G06Q 40/04 (2012.01)
G06Q 40/06 (2012.01)

(52) U.S. Cl.
CPC ............. *G06Q 40/06* (2013.01); *G06Q 40/04* (2013.01)

(58) Field of Classification Search
None
See application file for complete search history.

(56) References Cited

U.S. PATENT DOCUMENTS 6,505,174 B1 * 1/2003 Keiser ................... G06Q 40/00
705/36 R
7,774,263 B1 8/2010 Wunsch
(Continued)

OTHER PUBLICATIONS

A Flexible Notification System for Stocks Investors, IEEE (Year: 2009).*
(Continued)

*Primary Examiner* — Bruce I Ebersman
(74) *Attorney, Agent, or Firm* — NIXON & VANDERHYE P.C.

(57) ABSTRACT

A user terminal for communicating with a computer server is operated on behalf of a first user (a second user terminal is operated on behalf of a second user). The user terminal transmits to the computer server pre-trade information including an order and receives first offset information that indicates a first price offset value, which is different from a second price offset value sent to the second user terminal. The terminals receive a single message from the server that indicates a market price but does not include the first price offset value or the second price offset value. The user terminal modifies the market price using the first price offset value to obtain a first actual price different from a second actual price corresponding to a modification of the market price based on the second price offset value.

20 Claims, 2 Drawing Sheets

Related U.S. Application Data continuation of application No. 12/684,226, filed on Jan. 8, 2010, now Pat. No. 9,836,791.

(56) References Cited

U.S. PATENT DOCUMENTS

| | | | | |
|---|---|---|---|---|
| 8,219,472 | B2 * | 7/2012 | Iyer | G06Q 40/03 705/38 |
| 8,296,217 | B1 * | 10/2012 | Howorka | G06Q 40/06 705/37 |
| 8,473,400 | B1 | 6/2013 | May | |
| 8,566,213 | B2 | 10/2013 | Sweeting | |
| 8,583,536 | B1 * | 11/2013 | Deitz | G06Q 40/04 705/37 |
| 8,620,759 | B1 * | 12/2013 | Virgilio | G06Q 40/04 705/26.1 |
| 8,655,765 | B1 * | 2/2014 | Gastineau | G06Q 40/06 705/37 |
| 8,977,565 | B2 | 3/2015 | Alderucci | |
| 9,836,791 | B2 | 12/2017 | Jensen et al. | |
| 10,726,480 | B2 * | 7/2020 | Foygel | G06Q 40/04 |
| 10,832,326 | B2 | 11/2020 | Jensen et al. | |
| 11,379,919 | B2 | 7/2022 | Jensen et al. | |
| 2003/0236737 | A1 * | 12/2003 | Kemp, II | G06Q 40/04 705/37 |
| 2004/0093300 | A1 * | 5/2004 | Burns | G06Q 40/06 705/37 |
| 2004/0103054 | A1 * | 5/2004 | Singer | G06Q 40/04 705/37 |
| 2005/0119964 | A1 | 6/2005 | Brady et al. | |
| 2005/0149429 | A1 * | 7/2005 | Kemp, II | G06Q 40/00 705/37 |
| 2005/0228738 | A1 * | 10/2005 | Harris | G06Q 40/04 705/37 |
| 2005/0228743 | A1 * | 10/2005 | Warsaw | G06Q 40/04 705/37 |
| 2008/0141273 | A1 | 6/2008 | Borgendale | |
| 2010/0106633 | A1 * | 4/2010 | Iyer | G06Q 40/03 705/35 |
| 2010/0138334 | A1 * | 6/2010 | Warsaw | G06Q 40/04 705/37 |
| 2011/0078064 | A1 * | 3/2011 | Messina | G06Q 40/04 705/37 |
| 2011/0145125 | A1 * | 6/2011 | Foygel | G06Q 30/0601 705/26.1 |
| 2011/0166982 | A1 | 7/2011 | Cole | |
| 2018/0082377 | A1 * | 3/2018 | Jensen | G06Q 40/04 |

OTHER PUBLICATIONS

Alert Based Monitoring of Stock Trading Systems IEEE (Year: 2006).*

U.S. Appl. No. 17/855,917, filed Jul. 1, 2022, Inventor: Jensen et al.

T.G. Andersen et al, "The risk premia embedded in index options" Journal of Financial Economics, Jun. 2015, pp. 558-584.

B.W. Weber, "Transparency and bypass in electronic financial markets" IEEE (Year: 1994), 10 pages.

T. Hendershott, "Electronic trading in financial markets" IEEE (Year: 2003), 5 pages.

* cited by examiner

REDUCING DATA TRAFFIC IN A COMPUTERIZED TRADING SYSTEM

This application is a continuation of U.S. patent application Ser. No. 17/855,917, filed Jul. 1, 2022, which is a continuation of U.S. patent application Ser. No. 17/067,887, filed Oct. 12, 2020 (now U.S. Pat. No. 11,379,919), which is a continuation of U.S. patent application Ser. No. 15/827, 210, filed Nov. 30, 2017 (now U.S. Pat. No. 10,832,326), which is a continuation of U.S. patent application Ser. No. 12/684,226, filed Jan. 8, 2010 (now U.S. Pat. No. 9,836, 791), the entire contents of each of which are incorporated herein by reference.

TECHNICAL FIELD

The present invention relates to a method and a device for transmitting data in a computerized central trading system.

BACKGROUND

Today it is very common that information is sent over computer networks. The amount of information being sent is rapidly increasing due to the advances in technology, making it possible to send and handle more information at higher speed. Furthermore, new applications demand a higher amount of information.

Example computer systems where data transmission is quite important include electronic trading systems. Today, electronic trading of securities, derivatives, commodities and other financial instruments involves large amounts of order transactions transmitted to and from users of the electronic trading system. Furthermore the users connected to a centralized automated electronic trading system require low latency in the access to the system. In some cases it may not be enough to simply boost the performance in the central system by for example updating the hardware in order to get rid of a bottleneck or other latency problem in the system.

Moreover, some electronic trading systems allow different types of users to access the system. For example a fixed income market implemented in an electronic trading system can be configured to allow both primary users and secondary users to trade in the same instruments. The electronic trading system can for example be configured to let a primary user trade at the true trading price whereas a secondary user is charged an extra fee when using the system. The fee can typically be charged by adding an amount such as a tick when trading in the system. It is also common that the secondary users are hindered from seeing the real prices in the market. Instead the price displayed is the price including the additional charge. The extra fee that will be charged to a secondary user will then be applied to each price distributed from the market.

Below is an Example:

The electronic trading system has three different types of firms acting in the system.

Firm P_A—Primary customer A, users from this firm will be allowed to see the real prices in the market.

Firm S_B: Secondary firm B, users from this firm will not be allowed to the see the real market. They will instead see prices with an additional spread of 1 price tick.

Firm S_C: Secondary firm C, users from this firm will not be allowed to the see the real market. They will instead see prices with an additional spread of 2 price ticks.

Security Y is traded with a price tick step size of 0.5. The real market prices are:

| Bid size | Bid | Offer | Offer size |
|---|---|---|---|
| 3 | 100.0 | 101.0 | 5 |
| 2 | 100.0 | 101.5 | 7 |
| 10 | 99.5 | 102.0 | 2 |

This will be the price picture displayed to users connected to customer P_A.

Based on the extra fee configuration the following view of the market for should be displayed to:

Customer S_B:—Additional Spread=1 pt=+/−0.5:

| B.size | Bid | Offer | O.size |
|---|---|---|---|
| 3 | 99.5 | 101.5 | 5 |
| 2 | 99.5 | 102.0 | 7 |
| 10 | 99.0 | 102.5 | 2 |

Customer S_C:—Additional Spread=2 pt=+/−1.0:

| B.size | Bid | Offer | O.size |
|---|---|---|---|
| 3 | 99.0 | 102.0 | 5 |
| 2 | 99.0 | 102.5 | 7 |
| 10 | 98.5 | 103.0 | 2 |

The additional, off-set, spread values should have an effect on both pre-trade prices and post-trade prices. The price information is a very common field in a trading Application Program Interface (API) and it exists in most of the messages going in and out from the electronic trading system.

When generating and distributing the different orderbooks as shown above to the respective users a separate message to each type of firm must be generated. In the example above this would mean that the central system would need to generate 3 separate message flows, one for each firm.

Three separate messages are sent out from the system; one unique message for each type of user.

A typical trading system distributes a lot of different messages containing price information of some kind. With the solution described above it would mean that every message would need to be generated and distributed in three different ways which would have a major impact on both system performance and bandwidth impact on the network. Furthermore every customer type added to the system will add additional load to the system.

It would therefore be preferable to find a solution that requires less messages going out from the system regardless of the number of user types.

Hence, there exist a need for a method and a system that is able to accommodate for different orderbook interfaces for different types of users and at the same time reduce or eliminate the need for use of additional bandwidth resources.

The invention will significantly reduce the amount of data needed to be transmitted from the central system when the central system is connected to users that are trading using different offset spread values.

SUMMARY

It is an object of the present invention to overcome or at least reduce some of the problems associated with transmission of messages in an electronic trading system as set out above.

This object and others are obtained by the method and system as set out in the appended claims. Thus, one single type of message is distributed to all users connected to the system regardless of the type of user.

A message is then processed by the user in response to a setting in the central system. In particular the message is processed in response to a setting corresponding to the pricing for the user.

In accordance with one embodiment a computerized trading system configured to receive buy and sell trade orders in financial instruments traded in the central trading system from user terminals connected to the central trading system is provided. The user terminals are of at least two types trading in the central system at different off-set spread values and the central trading system further being configured to transmit price information to the at least two types of user terminals. The central system is then configured to transmit price information to the at least two types of user terminals, wherein the central system is configured to transmit a price information message to the at least two types of user terminals in one message being the same for the at least two types of user terminals single message and where the user terminals are configured to display the price information in said price information message including said different off-set spread values. Hereby a reduced number of messages needs to be transmitted in that the user terminals are enabled to convert the single message stream to the correct price information valid for each particular user.

In accordance with one embodiment the system can be configured to transmit post trade messages transmitted from the central system to the individual users as one message per matched trade order.

In accordance with one embodiment the central system can be configured to provide a parameter corresponding to an additional spread value configured for a particular user of the central system exchange.

In accordance with one embodiment the central system can configured to provide the parameter corresponding to an additional spread value upon creation of a session between the user and the central system.

In accordance with one embodiment a user terminal configured to transmit buy and sell trade orders in financial instruments traded in a central trading system is provided. The user terminal is further configured to display price information received from the central system. The user terminal is also configured to add an additional spread value for the particular user terminal to the received price information before it is displayed.

In accordance with one embodiment the user terminal is configured to receive the additional spread value from the central trading system. In accordance with one embodiment the additional spread value is received upon creation of a session between the user and the central system.

In accordance with one embodiment a reference data model is used in the central system enabling the exchange to configure a parameter corresponding to an Additional Spread value for each user or customer in the system. In accordance with one embodiment the parameter can also be set differently for different financial instruments traded in the central system.

The invention also extends to methods for operating the computer system and user terminals in accordance with the above. The invention also extends to computer program product enabling a computer to execute the method of operating the computer system and user terminals in accordance with the invention.

The settings in the central system can be distributed to the user upon creation of a session between the user and the central system.

DETAILED DESCRIPTION

Figure 1:
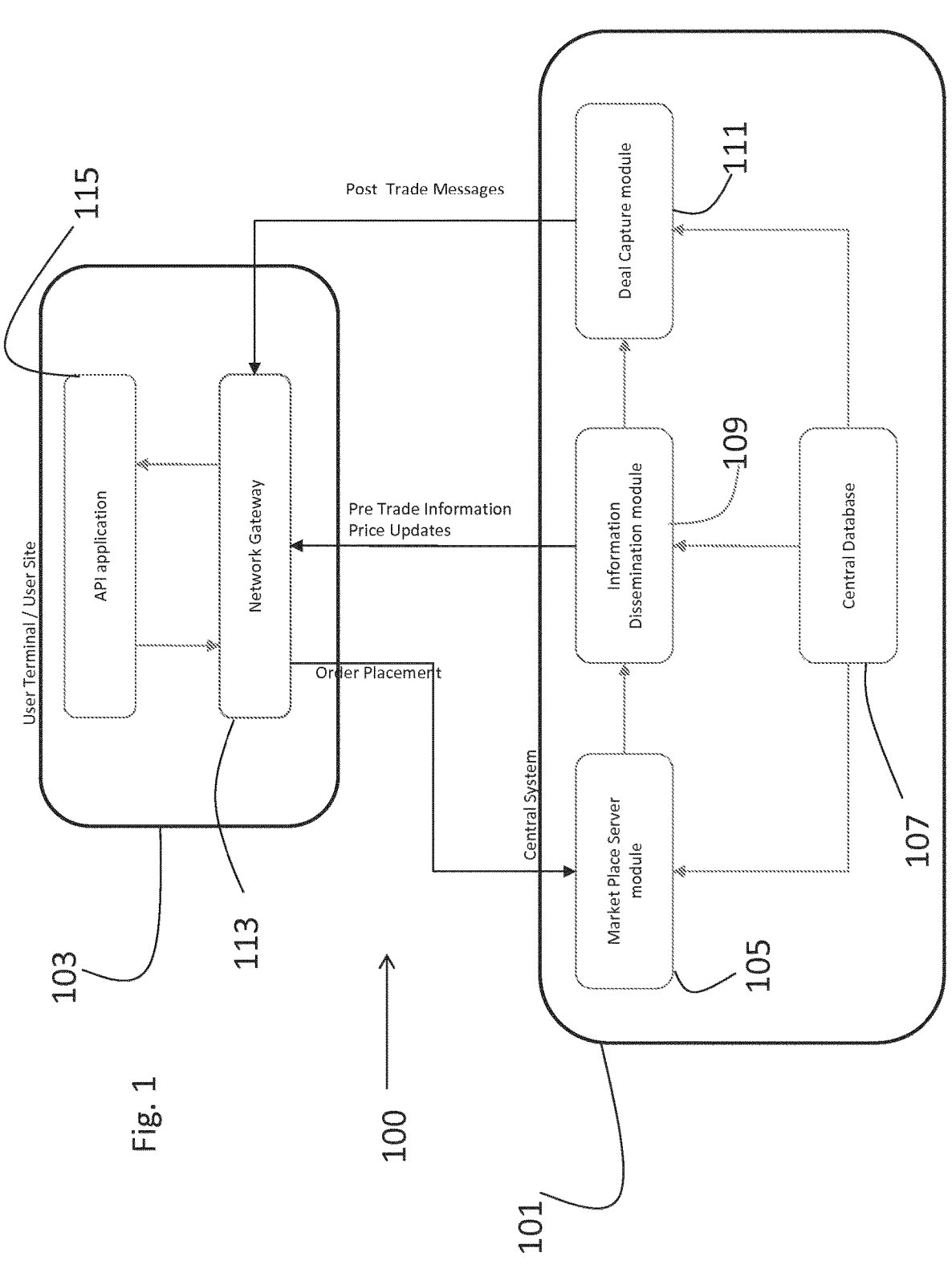
FIG. 1 is a view illustrating an exemplary computerized trading system.

In FIG. 1 a view illustrating an exemplary computerized trading system 100 is depicted. The system 100 comprises a central system 101 connected to a number of user terminals/user sites 103. In FIG. 1 only one user terminal 103 is depicted but it is understood that many, typically a large number of user terminals are connected to the central system 101. The central system 101 is configured to automatically match trading orders received from the users and to output the result as a deal including, at least two, matched trade orders. The trade orders received from the user terminals 103 are received by a market place server module 105 configured to receive orders using suitable software stored on a memory and processed by a processor associated with the market place server module. In a typical configuration the market place server serves the received trade orders in accordance with a first come first serve manner such that as soon an order is received that matches an earlier received order that is stored in an orderbook the matching orders are matched, and subsequently, a deal of the matching orders is formed. If the received order cannot immediately match an existing order in the orderbook, then the received order is placed in the orderbook for matching against subsequently received orders provided that the order is of a type that allows for the order to be stored in the orderbook. The orderbook information can for example be stored in a common database 107 accessible by several computer-based processing modules of the central system.

When an order is received by the central system, the system is configured to disseminate the new information to all users. The dissemination of information is performed by an information dissemination module 109 comprising a memory storing suitable software which can be executed using a processor associated with the information dissemination module 109. The information dissemination module can also be connected to the common database 107 for receiving information therefrom and to the market place server 105 for receiving information therefrom too. For example, the information dissemination module can receive orderbook information from the common data base and information relating to matched orders from the market place server. As is explained above in some scenarios not all users trade at the same price. Instead some users may trade at a spread value offset. The information dissemination module 109 is configured to transmit information to the user terminals 103 without any spread value offset. Instead the user terminals/user sites are configured to automatically re-calculate the information received from the central system to accurately reflect prices including the correct spread value. This can be implemented in various ways as will be described below. The central system 101 can also comprise a deal capture module 111. The deal capture module can typically comprise a memory storing suitable software which can be executed using a processor associated with the deal capture module 111. The deal capture module 111 can also be connected to the common database 107 for receiving information therefrom and to the market place server 105. When a deal is made by matching at least two trade orders in the market place server the matched trade orders are formed into a deal in the deal capture module. When the deal is formed in the deal capture module 111 a post trade message can be sent to the parties having sent the matched trade orders to the central system. In one embodiment the post trade messages transmitted from the central system to the individual users are sent as individual messages, i.e. one message per matched trade order. The post trade message can then be sent including all fees and spread offset values and there is no need for the user to further process the information to generate the price of the matched trade order.

The user terminal 103 can typically comprise a gateway 113 forming the transmitting/receiving interface via which trade orders are transmitted to the central system 101 and messages such as pre-trade and post trade messages are received from the central system. In addition the user can comprise an API application 115 that is configured to automatically re-calculate the information received from the central system to accurately reflect prices including the correct spread value using a processor of the user terminal 103.

Figure 2:
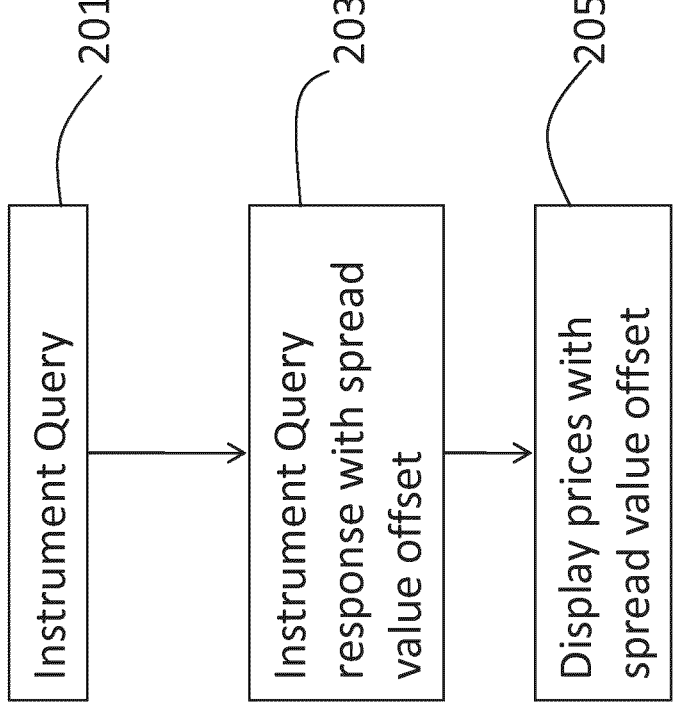
FIG. 2 is a flow chart illustrating some procedural steps performed in accordance with a first example embodiment.

In FIG. 2 a flow chart illustrating some procedural steps performed when disseminating data from the central system 101 is shown. First in a step 201, the user terminal 103 provides an Application Program Interface (API) query that will be used by the user application at login to download a list of all securities/security groups (depending on granularity on the configuration) or other financial instruments traded in the central system. Next in a step 203 an answer comprising a parameter or a set of parameters will be provided. The query answer can for example comprise, for each instrument/group of instruments, a parameter corresponding to an additional offset spread value configured for that user of the central system exchange or if different additional spread values are to be used for different traded instruments or groups of instruments a set of parameters can be provided. The trading application will then in a step 205 apply these spread values received for the central system to modify published prices before they are displayed on the screen of the trader. As a result a trader trading in the central system will see the prices he will trade on including the additional spread value. The central system will then only need to distribute real market prices in the API and there is no need to duplicate messages over the API.

In a second embodiment a modified price is distributed via the API. All frontends, including the primary users, are forced to apply the configured spread before it is presented on the screen. In such a scenario the real price is not transmitted over the API. Instead all users need to apply an offset spread value to correctly display the trading price at which that particular user trades in the central system.

Using the method and system as described herein will enable the system to only distribute a single message stream. This will be an efficient solution from a performance and bandwidth perspective. No duplicated price messages will be needed. Secondary customers will be allowed to subscribe to the same messages as the primary clients. However, before a distributed price is presented to an end user it will, depending on the type of end user, be modified by the user application. The modification can differ depending on what type of price message that is received by the application and how the instrument is traded. In accordance with one embodiment Post-trade messages are handled differently than pre-trade messages. Thus, in one embodiment post trade messages transmitted from the central system to the individual users are sent as individual messages, i.e. one message per matched trade order. The post trade message can then be sent including all fees and spread offset values and there is no need for the user to further process the information to generate the price of the matched trade order. Below an exemplary setting is described in more detail.

Pre-Trade Messages

All pre-trade messages contain information about prices related to an order book side, i.e. a bid side or an offer side. The user application must therefore be coded to look on both the price and the order book side to determine which value that shall be presented in the Graphical User Interface (GUI). The instruments ranking type will also have an impact on this procedure. The user application can be configured to perform the following actions: For instruments traded on price with a first, non-inverted (normal), ranking:

Add the spread value to prices related to the offer side.

Subtract the spread value from prices related to the bid side.

For instruments traded on yield/rate with a second, inverted, ranking:

Add the spread value to prices related to the bid side.

Subtract the spread value from prices related to the offer side.

The user application can also be configured to convert prices that have been specified by a user before the values are sent to the central system via the API. For example when a user generates an order to be transmitted to the central system, the user will specify a price that corresponds to the prices that he sees on the screen. This value is then modified in the user terminal based on the offset spread value before they are specified in the order transaction. The logic specified above can then be applied in a reverse mode.

The invention as described herein can advantageously be implemented using computer program software stored on a memory and loadable into a computer so that when the computer executes the program segments of the software the computer is caused to execute the method steps as described above.

Using the method and system as described herein significantly reduces the amount of data needed to be transmitted from the central system when the central system is connected to users that are trading using different offset spread values.

The invention claimed is:

1. A local site first computer terminal at a first local site for communicating with a remote electronic exchange system that communicates with a plurality of local site computer terminals over a computer network, wherein the plurality of local site computer terminals include the first local site computer terminal and a second local site computer terminal, wherein the first local site computer terminal is operable on behalf of a first entity and the second local site computer terminal is operable on behalf of a second entity, the first local site computer terminal comprising:

a transmitting/receiving interface;

at least one hardware processor;

wherein the at least one hardware processor is configured to:

receive from the remote electronic exchange system, via the computer network, first offset information that indicates a first price offset value associated with a price of a financial instrument, where the first price offset value is different from a second price offset value sent from the remote electronic exchange system, via the computer network, to the second local site computer terminal;

receive, after receiving the first offset information, a message transmitted from the electronic exchange system via the computer network to the first local site computer terminal, the message also having been transmitted to the second local site computer terminal, wherein:

(i) the message indicates a market price for a financial instrument, and (ii) the message does not include the first price offset value or the second price offset value;

wherein the at least one hardware processor is configured to modify the market price for the financial instrument using the first price offset value to obtain a first actual price for the financial instrument that is different from a second actual price for the financial instrument, wherein the second actual price corresponds to a modification of the market price for the financial instrument based on the second price offset value, thereby by eliminating a need for the remote electronic exchange system to transmit duplicated market price messages for the financial instrument to different local site computers trading the financial instrument using different price offset values, which reduces an amount of data needed to be transmitted over the computer network; and wherein the at least one hardware processor is configured to transmit to the remote electronic exchange system, via the computer network, information including an order with the first actual price for the financial instrument.

2. The first computer terminal in claim 1, wherein the first local site computer terminal is of a first type and the second local site computer terminal is of a second type, and wherein the second type and the first type are different.

3. The first computer terminal in claim 1, wherein the at least one hardware processor is configured to receive from the remote electronic exchange system, via the computer network, the first price offset value when a predetermined login occurs in the first local site computer terminal.

4. The first computer terminal in claim 1, wherein the at least one hardware processor is associated with an application programming interface.

5. The first computer terminal in claim 1, wherein when the market price for the financial instrument is an offer price, the at least one hardware processor is configured to add the first price offset value to the offer price, and wherein when the market price for the financial instrument is a bid price, the at least one hardware processor is configured to subtract the first price offset value from the bid price.

6. The first computer terminal in claim 1, wherein the message indicates a published price for the financial instrument.

7. The first computer terminal in claim 1, wherein the first and second price offset values are spread offset values.

8. A method for a first local site computer terminal at a first local site to communicate with a remote electronic exchange system that communicates with a plurality of local site computer terminals over a computer network, wherein the plurality of local site computer terminals include the first local site computer terminal and a second local site computer terminal, and wherein the first local site computer terminal is operated on behalf of a first entity and the second local site computer terminal is operated on behalf of a second entity, the method comprising:

receiving from the remote electronic exchange system, via the computer network, first offset information that indicates a first price offset value associated with a price of a financial instrument, where the first price offset value is different from a second price offset value sent by the remote electronic exchange system to the second local site computer terminal;

receiving, via the computer network, after receiving the first offset information, a message transmitted from the remote electronic exchange system to the first local site computer terminal, the message also having been transmitted to the second local site computer terminal, wherein:

(i) the message indicates a market price for a financial instrument, and (ii) the message does not include the first price offset value or the second price offset value;

modifying, by at least one hardware processor, the market price for the financial instrument using the first price offset value to obtain a first actual price for the financial instrument that is different from a second actual price for the financial instrument, wherein the second actual price corresponds to a modification of the market price for the financial instrument based on the second price offset value, thereby by eliminating a need for the remote electronic exchange system to transmit duplicated market price messages for the financial instrument to different local site computers trading the financial instrument using different price offset values, which reduces an amount of data needed to be transmitted over the computer network; and transmitting, via the computer network, to the remote electronic exchange system, information including an order with the first actual price for the financial instrument.

9. The method in claim 8, wherein the first local site computer terminal is of a first type and the second local site computer terminal is of a second type, and wherein the second type and the first type are different.

10. The method in claim 8, further comprising transmitting to the remote electronic exchange system a query that requests the first price offset value.

11. The method in claim 10, further comprising transmitting the query to the remote electronic exchange system in response to the first entity logging in to the remote electronic exchange system at the first local site computer terminal.

12. The method in claim 8, wherein the method further comprises:

when the market price for the financial instrument is an offer price, adding the first price offset value to the offer price, and when the market price for the financial instrument is a bid price, subtracting the first price offset value from the bid price.

13. The method in claim 8, wherein the message indicates a published price for a financial instrument.

14. The method in claim 8, wherein the first and second price offset values are spread offset values.

15. A system, comprising:

an electronic exchange including:

one or more memories; and one or more hardware processors;

wherein the one or more memories and the one or more hardware processors are configured to perform operations that include:

receiving, over a computer network from a first local site computer terminal operable on behalf of a primary entity, information including a first order for a financial instrument;

receiving, over the computer network from a second local site computer terminal operable on behalf of a secondary entity, information including a second order for a financial instrument;

storing the information including the first order and the second order in a database;

transmitting, over the computer network to the first local site computer terminal, first price information associated with the financial instrument;

transmitting, over the computer network to the second local site computer terminal, second price information associated with the financial instrument, wherein the second price information and the first price information are different; and after transmitting the first price information and the second price information, transmitting over the computer network a message to the first local site computer terminal and to the second local site computer terminal, wherein:

(i) the message indicates a market price for the financial instrument, and (ii) the message does not include the first price information or the second price information for the financial instrument;

wherein the first price information is useable by the first local site computer terminal to obtain the market price for the financial instrument for the primary entity and the second price information is useable by the second local site computer terminal to modify the market price for the financial instrument to obtain an actual price for the financial instrument for the secondary entity, thereby by eliminating a need for the electronic exchange to transmit duplicated market price messages for the financial instrument to different local site computers trading the financial instrument using different price offset values, which reduces an amount of data needed to be transmitted over the computer network.

16. The system in claim 15, wherein the first local site computer terminal is of a first type and the second local site computer terminal is of a second type different from the first type.

17. The system in claim 15, wherein the one or more memories and the one or more hardware processors are configured to perform further operations that include receiving from the second local site computer terminal a query that requests the second price information.

18. The system in claim 15, wherein the one or more memories and the one or more hardware processors are configured to transmit a post trade message for a matched order for the financial instrument, and wherein the post trade message includes fees and spread offset values associated with the matched order for the financial instrument.

19. The system in claim 15, wherein the first price information includes the market price for the financial instrument and the second price information includes a spread offset value useable by the second local site computer terminal to modify the market price for the financial instrument.

20. The system in claim 15, wherein:

when the market price for the financial instrument is an offer price, the second price information is usable by the second local site computer terminal to obtain the actual offer price for the financial instrument for the secondary entity, and when the market price for the financial instrument is a bid price, the second price information is usable by the second local site computer terminal to obtain the actual bid price for the financial instrument for the secondary entity.

* * * * *